US009756609B2

(12) United States Patent
Seo et al.

(10) Patent No.: US 9,756,609 B2
(45) Date of Patent: Sep. 5, 2017

(54) MULTIMEDIA BROADCAST/MULTICAST SERVICE METHOD AND APPARATUS FOR DEVICE-TO-DEVICE (D2D) COMMUNICATION IN WIRELESS COMMUNICATION SYSTEM

(71) Applicant: LG ELECTRONICS INC., Seoul (KR)

(72) Inventors: Daewon Seo, Seoul (KR); Seungmin Lee, Seoul (KR); Hakseong Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/774,085

(22) PCT Filed: Mar. 28, 2014

(86) PCT No.: PCT/KR2014/002660
§ 371 (c)(1),
(2) Date: Sep. 9, 2015

(87) PCT Pub. No.: WO2014/163335
PCT Pub. Date: Oct. 9, 2014

(65) Prior Publication Data
US 2016/0044634 A1    Feb. 11, 2016

Related U.S. Application Data

(60) Provisional application No. 61/807,313, filed on Apr. 1, 2013, provisional application No. 61/815,254, filed (Continued)

(51) Int. Cl.
*H04H 20/71* (2008.01)
*H04W 72/00* (2009.01)
(Continued)

(52) U.S. Cl.
CPC .......... *H04W 72/005* (2013.01); *H04B 7/155* (2013.01); *H04W 4/06* (2013.01);
(Continued)

(58) Field of Classification Search
CPC ............. H04W 72/005; H04W 72/042; H04W 76/002; H04W 76/023; H04W 76/043; H04W 4/06; H04W 8/005; H04B 7/155
See application file for complete search history.

(56) References Cited

U.S. PATENT DOCUMENTS 9,185,700 B2 *  11/2015  Seo ..................... H04J 11/0069
9,380,442 B2 *   6/2016  Turtinen ............... H04W 8/005
(Continued)

FOREIGN PATENT DOCUMENTS

WO   2012/071736   6/2012
WO   2012/077971   6/2012
(Continued)

OTHER PUBLICATIONS

PCT International Application No. PCT/KR2014/002660, Written Opinion of the International Searching Authority dated Jul. 17, 2014, 21 pages.
(Continued)

*Primary Examiner* — Kevin Mew
(74) *Attorney, Agent, or Firm* — Lee Hong Degerman Kang Waimey

(57) ABSTRACT

The present invention relates to a method for providing, by a first UE, which conducts a device-to-device (D2D) communication, a multimedia broadcast/multicast service (MBMS) in a wireless communication system. In particular, the method comprises steps of: receiving, by a first UE, control information for a D2D communication; and providing, by the first UE, an MBMS to a second UE which is
(Continued)

intended for the D2D communication, wherein the MBMS is configured to be transmitted using an uplink resource.

13 Claims, 12 Drawing Sheets

Related U.S. Application Data on Apr. 23, 2013, provisional application No. 61/857,701, filed on Jul. 24, 2013.

(51) Int. Cl.
| | |
|---|---|
| *H04B 7/155* | (2006.01) |
| *H04W 76/04* | (2009.01) |
| *H04W 4/06* | (2009.01) |
| *H04W 8/00* | (2009.01) |
| *H04W 72/04* | (2009.01) |
| *H04W 76/02* | (2009.01) |
| *H04W 76/00* | (2009.01) |

(52) U.S. Cl.
CPC ......... *H04W 8/005* (2013.01); *H04W 72/042* (2013.01); *H04W 76/023* (2013.01); *H04W 76/043* (2013.01); *H04W 76/002* (2013.01)

(56) References Cited

U.S. PATENT DOCUMENTS

| | | | | |
|---|---|---|---|---|
| 2010/0009675 | A1 | 1/2010 | Wijting et al. | |
| 2010/0254295 | A1 | 10/2010 | Ahn et al. | |
| 2011/0258327 | A1* | 10/2011 | Phan | H04W 16/10 709/227 |
| 2012/0120885 | A1* | 5/2012 | Wang | H04W 72/04 370/329 |
| 2013/0083779 | A1* | 4/2013 | Ahn | H04W 72/04 370/336 |
| 2013/0176950 | A1* | 7/2013 | Hakola | H04W 72/042 370/329 |
| 2013/0184024 | A1* | 7/2013 | Chen | H04W 76/023 455/509 |
| 2013/0223356 | A1* | 8/2013 | Khoshnevis | H04W 72/042 370/329 |
| 2013/0229931 | A1* | 9/2013 | Kim | H04W 24/10 370/252 |
| 2013/0260812 | A1* | 10/2013 | Li | H04W 12/06 455/509 |
| 2013/0301438 | A1* | 11/2013 | Li | H04W 76/048 370/252 |
| 2013/0308551 | A1* | 11/2013 | Madan | H04W 72/0406 370/329 |
| 2013/0322413 | A1* | 12/2013 | Pelletier | H04W 72/1289 370/336 |
| 2014/0003262 | A1* | 1/2014 | He | H04W 28/08 370/252 |
| 2014/0003319 | A1* | 1/2014 | Etemad | H04W 28/08 370/312 |
| 2014/0057670 | A1* | 2/2014 | Lim | H04W 8/005 455/509 |
| 2014/0226504 | A1* | 8/2014 | Tavildar | H04W 72/082 370/252 |
| 2014/0241256 | A1* | 8/2014 | Jiang | H04W 72/1215 370/329 |
| 2016/0044634 | A1* | 2/2016 | Seo | H04W 72/005 370/312 |

FOREIGN PATENT DOCUMENTS

| | | |
|---|---|---|
| WO | 2012/082024 | 6/2012 |
| WO | 2012077981 | 6/2012 |

OTHER PUBLICATIONS

PCT International Application No. PCT/KR2014/002660, Written Opinion of the International Searching Authority dated Jul. 17, 2014, 14 pages.

New Postcom, "Evaluation scenarios and channel models for D2D communications," 3GPP TSG-RAN WG1 #72, R1-130154, Feb. 2013, 5 pages.

Vodafone, "Aspects of ProSe for Public Safety Communications," SA WG2 #95, S2-130400, Feb. 2013, 2 pages.

* cited by examiner

FIG. 2
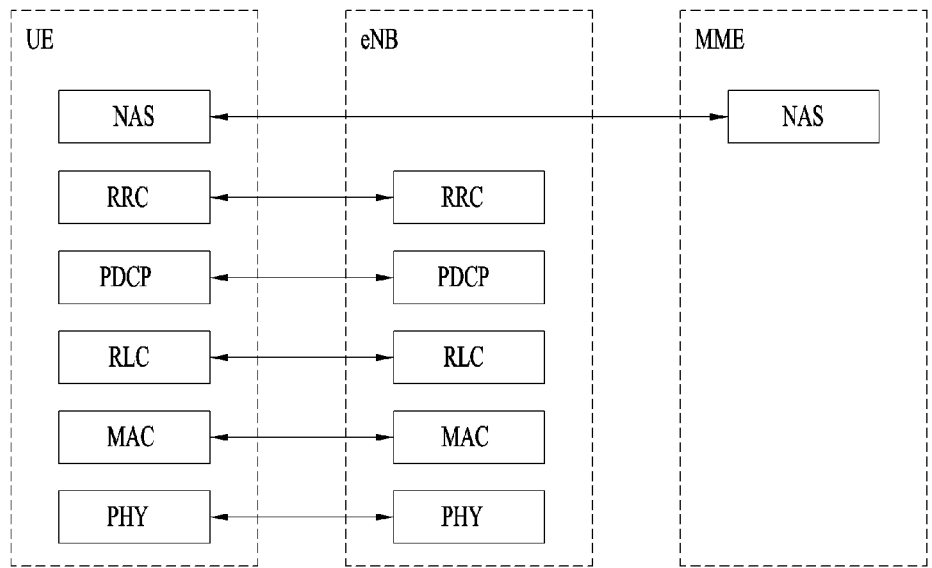
(A) CONTROL-PLANE PROTOCOL STACK
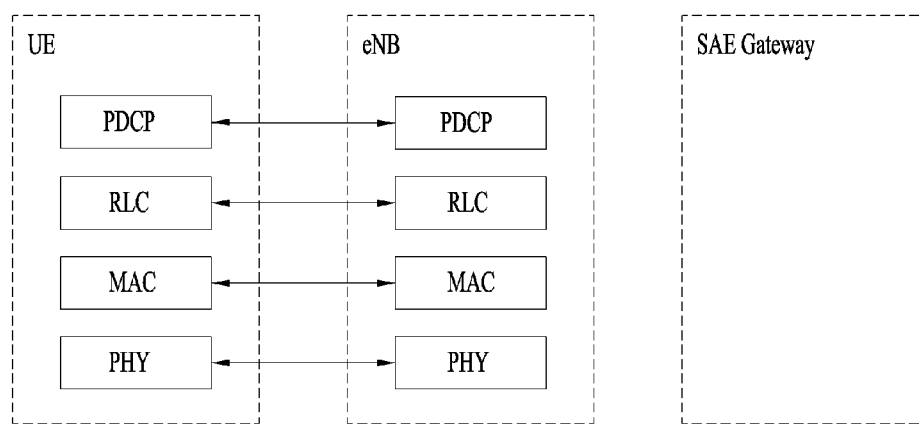
(B) USER-PLANE PROTOCOL STACK (a)  (b)

MULTIMEDIA BROADCAST/MULTICAST SERVICE METHOD AND APPARATUS FOR DEVICE-TO-DEVICE (D2D) COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2014/002660, filed on Mar. 28, 2014, which claims the benefit of U.S. Provisional Application No. 61/807,313, filed on Apr. 1, 2013, 61/815,254, filed on Apr. 23, 2013 and 61/857,701, filed on Jul. 24, 2013, the contents of which are all hereby incorporated by reference herein in their entirety.

TECHNICAL FIELD

The present invention relates to a wireless communication system and, more particularly, to a multimedia broadcast/multicast service method for device-to-device (D2D) communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention is to provide a multimedia broadcast/multicast service method for device-to-device (D2D) communication in a wireless communication system and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention for achieving the objects of the present invention, provided herein a method for providing a multimedia broadcast/multicast service (MBMS) by a first user equipment (UE) performing device-to-device (D2D) communication in a wireless communication system, including receiving control information for D2D communication; and providing the MBMS to a second UE corresponding to a counterpart entity of D2D communication, wherein the MBMS is configured to be transmitted using an uplink resource.

The control information may be configured for D2D discovery and D2D data communication.

The MBMS may be configured to include at least one of a D2D grant, resource allocation information for D2D communication, a D2D signal type, and transmit power.

The MBMS may be decoded based on an identifier of the second UE.

The MBMS may be transmitted using an extended cyclic prefix.

The MBMS may be configured to be monitored by a UE in a D2D idle state or a UE in a radio resource control (RRC) idle state.

If the MBMS is received by a base station (BS), the BS may retransmit the MBMS through a downlink resource. The method may further include performing decoding based on an identifier of the first UE upon receiving the MBMS retransmitted by the BS, and if decoding is successful, the first UE may determine that the MBMS has been successfully transmitted to the second UE.

The control information for D2D communication may be transmitted by a base station (BS) using a single frequency network (SFN) scheme. The first UE and the second UE may belong to different BSs and the control information for D2D communication may be transmitted by eNBs corresponding to the first UE and the second UE. The second UE may not belong to the BS. The MBMS may be configured to include at least one of a synchronization signal for D2D communication, time information for D2D communication, radio resource allocation information for D2D communication, and a type of D2D communication.

The MBMS may be semi-statically transmitted.

The first UE and the second UE may not present in coverage of a BS.

In another aspect of the present invention for achieving the objects of the present invention, provided herein a first user equipment (UE) for providing a multimedia broadcast/multicast service (MBMS) by a first user equipment (UE) performing device-to-device (D2D) communication in a wireless communication system, including a radio frequency (RF) unit; and a processor, wherein the processor is configured to receive control information for D2D communication and provide the MBMS to a second UE corresponding to a counterpart entity of D2D communication, and wherein the MBMS is configured to be transmitted using an uplink resource.

Advantageous Effects

According to the present invention, a multimedia broadcast/multicast service for D2D communication in a wireless communication system can be efficiently performed.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 2 is a diagram illustrating structures of a control plane and a user plane of a radio interface protocol between a user equipment and E-UTRAN based on the 3GPP radio access network standard.

BEST MODE

Figure 1:
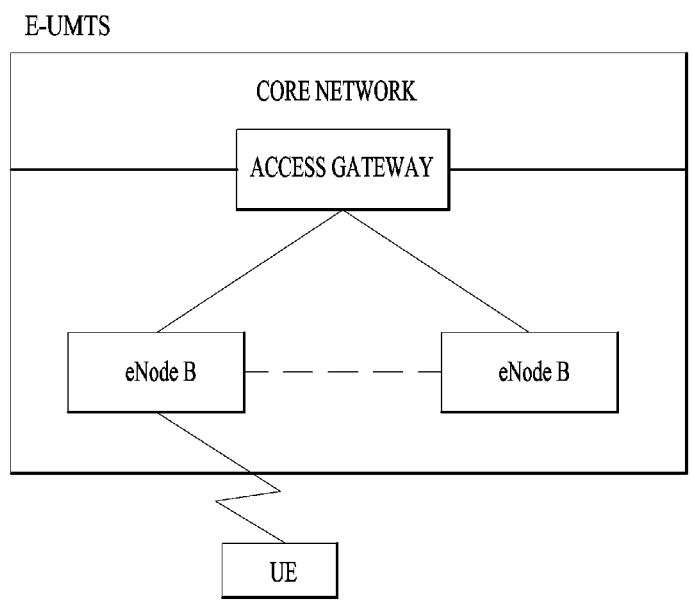
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
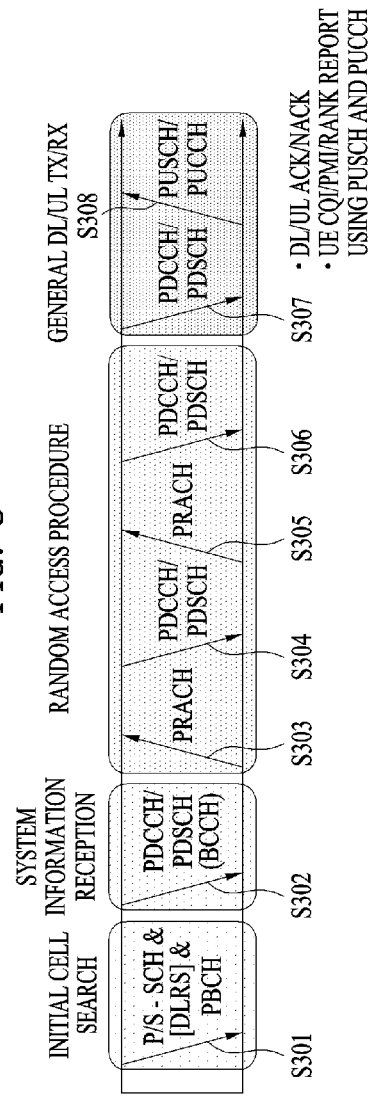
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
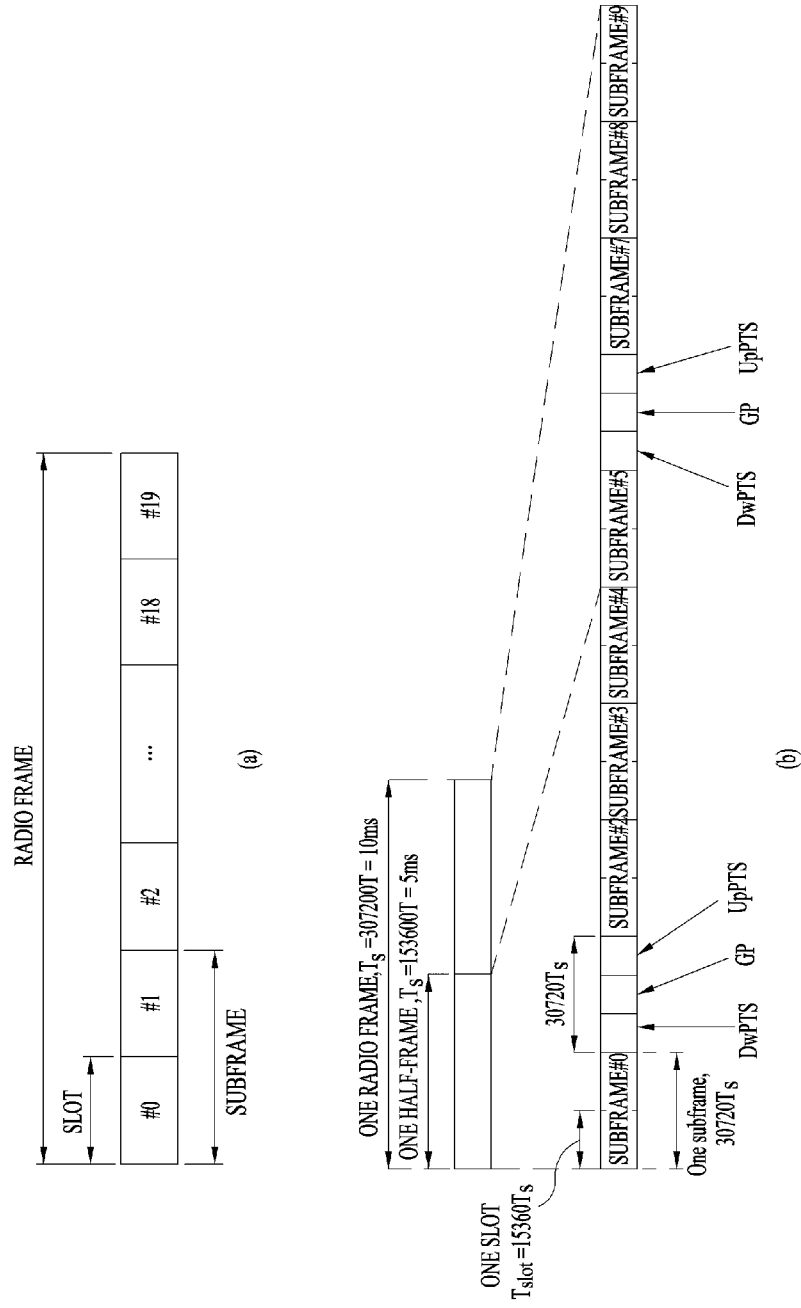
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
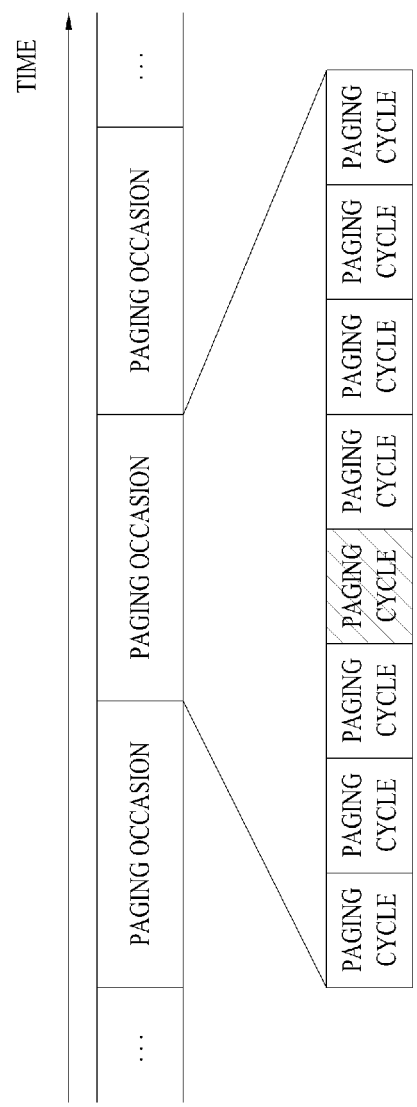
FIG. 5 is a diagram for explaining a general transmission and reception method using a paging message.

FIG. 5 is a diagram for explaining a general transmission and reception method using a paging message.

Referring to FIG. 5, the paging message includes a paging record having a paging cause and a UE identity. Upon receiving the paging message, the UE may perform a discontinuous reception (DRX) operation in order to reduce power consumption.

Specifically, a network configures a plurality of paging occasions (POs) in every time cycle called a paging DRX cycle and a specific UE receives only a specific PO and acquires a paging message. The UE does not receive a paging channel in POs other than the specific PO and may be in a sleep state in order to reduce power consumption. One PO corresponds to one TTI.

The eNB and the UE use a paging indicator (PI) as a specific value indicating transmission of a paging message. The eNB may define a specific identity (e.g., paging radio network temporary identity (P-RNTI)) as the PI and inform the UE of paging information transmission. For example, the

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

UE wakes up in every DRX cycle and receives one subframe to determine whether a paging message directed thereto is present. In the presence of the P-RNTI on an L1/L2 control channel (a PDCCH) in the received subframe, the UE is aware that a paging message exists on a PDSCH of the subframe. When the paging message includes an ID of the UE (e.g., an international mobile subscriber identity (IMSI)), the UE receives a service by responding to the eNB (e.g., establishing an RRC connection or receiving system information).

Next, system information will be described. The system information should contain indispensable information that the UE should be aware of to access the eNB. Therefore, the UE should receive all system information before accessing the eNB and should have up-to-date system information all the time. Since all UEs in a cell should be aware of the system information, the eNB periodically transmits the system information.

The system information can be divided into a master information block (MIB), a scheduling block (SB), and a system information block (SIB). The MIB enables the UE to recognize a physical configuration of a corresponding cell, for example, bandwidth. The SB indicates transmission information of SIBs, for example, a transmission cycle. The SIB is an aggregate of related system information. For instance, a specific SIB contains only information of a neighbor cell and another SIB contains only information of a UL radio channel used by the UE.

Hereinafter, a multimedia broadcast multicast service (MBMS) will be described. The MBMS is a service for simultaneously transmitting a multimedia data packet to a plurality of UEs as a broadcast/multicast service. The "broadcast/multicast service" or "MBMS" used in this document may be replaced with other terms such as "point-to-multipoint service" and "multicast and broadcast service (MBS)". The MBMS is based on IP multicast in which UEs receive the same multimedia data by sharing resources necessary for data packet transmission. Therefore, when UEs of a given level using the MBMS are present in the same cell, resource efficiency can be raised. The MBMS is irrelevant to an RRC connected state and, thus, a UE in an idle state may also receive the MBMS.

Figure 7:
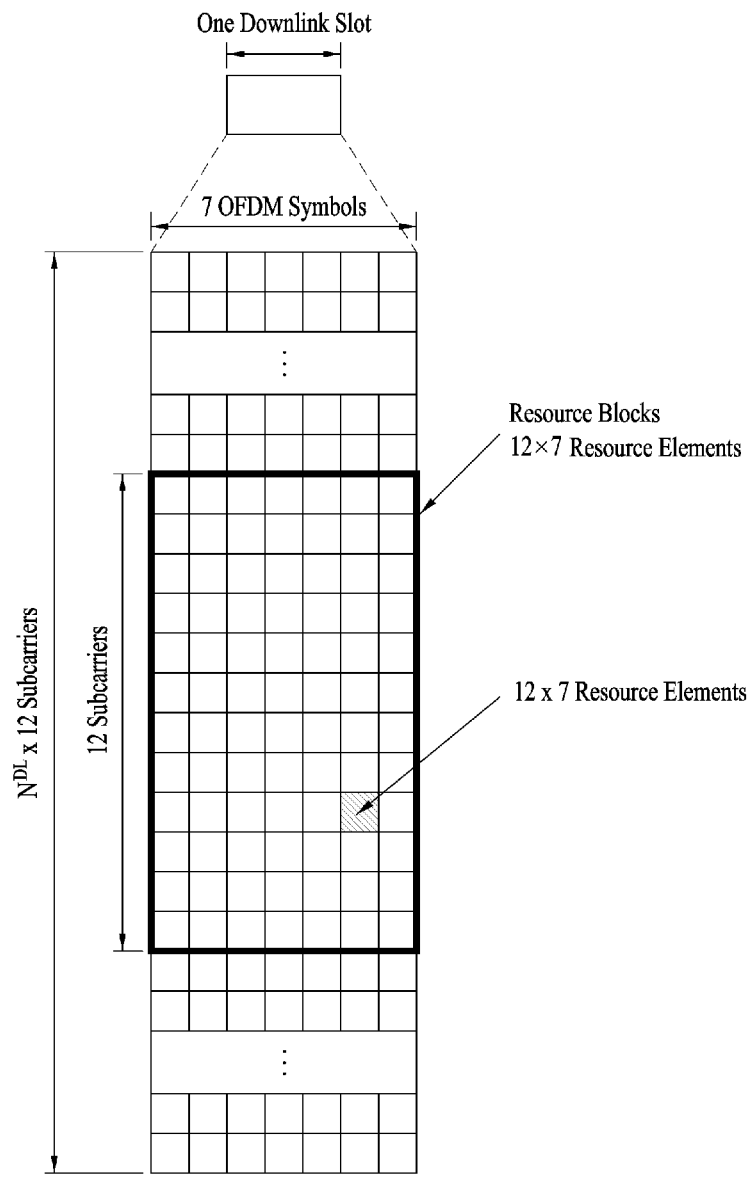
FIG. 7 illustrates a resource grid of a DL slot.

An MBMS control channel (MCCH) or an MBMS traffic channel (MTCH), which is a logical channel for an MBMS, may be mapped to an MBMS channel (MCH), which is a transport channel. The MCCH transmits an RRC message including common control information related to the MBMS and the MTCH transmits traffic of a specific MBMS. One MCCH is present in one MBMS single frequency network (MBSFN) area for transmitting the same MBMS information or traffic. If a plurality of MBSFN areas is provided in one cell, a UE may receive a plurality of MCCHs. FIG. 7 illustrates a scheme of transmitting MCCH information.

Figure 6:
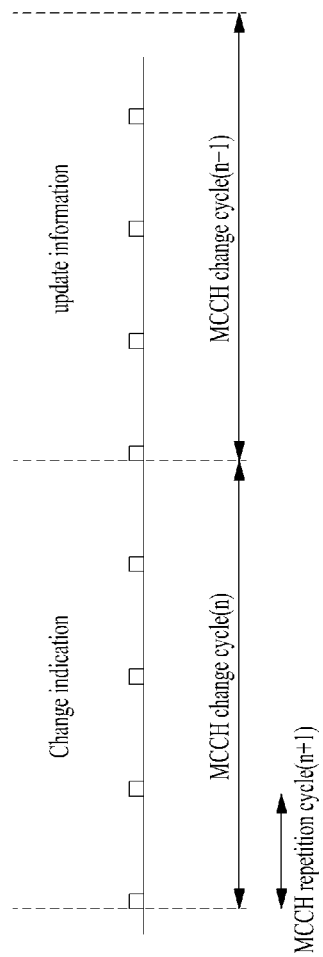
FIG. 6 illustrates a scheme of transmitting MBMS control channel (MCCH) information.

Referring to FIG. 6, if an MBMS related RRC message is changed in a specific MCCH, a PDCCH transmits an MBMS-radio network temporary identity (M-RNTI) and an MCCH indicator indicating the specific MCCH. A UE supporting an MBMS may receive the M-RNTI and the MCCH indicator via the PDCCH, checks that the MBMS-related RRC message has been changed in the specific MCCH, and receive the specific MCCH. The RRC message of the MCCH may be changed according to change cycle and may be repeatedly broadcast each repetition cycle.

Meanwhile, the MCCH transmits an MBMS session, which is currently underway, and an MBSFN area configuration (MBSFNAreaConfiguration) message indicating RB configuration corresponding to the MBMS session. The MCCH may also transmit an MBMS counting request (MBMSCountingRequest) message for counting the number of UEs in an RRC connected state which receive or desire to receive one or more MBMSs.

In addition, specific MBMS control information may be transmitted via a BCCH. In particular, the specific MBMS control information may be included in system information block type 13, which is broadcast via the BCCH.

FIG. 7 illustrates a resource grid of a DL slot.

Referring to FIG. 7, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 7 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE is indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL bandwidth configured in a cell.

Figure 8:
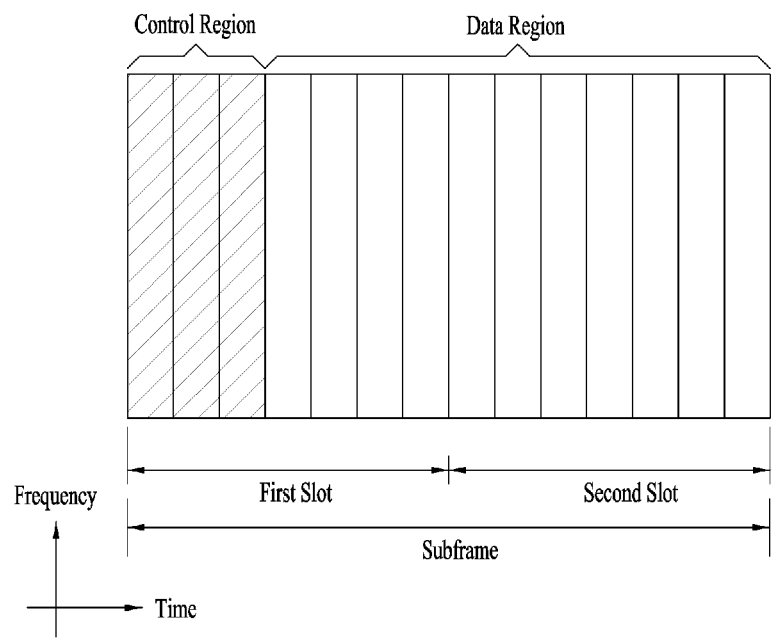
FIG. 8 illustrates the structure of a DL subframe.

FIG. 8 illustrates the structure of a DL subframe.

Referring to FIG. 8, up to three or four OFDM symbols at the start of the first slot of a DL subframe are used as a control region to which control channels are allocated and the other OFDM symbols of the DL subframe are used as a data region to which a PDSCH is allocated. DL control channels defined for the LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked by an identifier (ID) (e.g. a radio network temporary identifier (RNTI)) according to the owner or use of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

Figure 9:
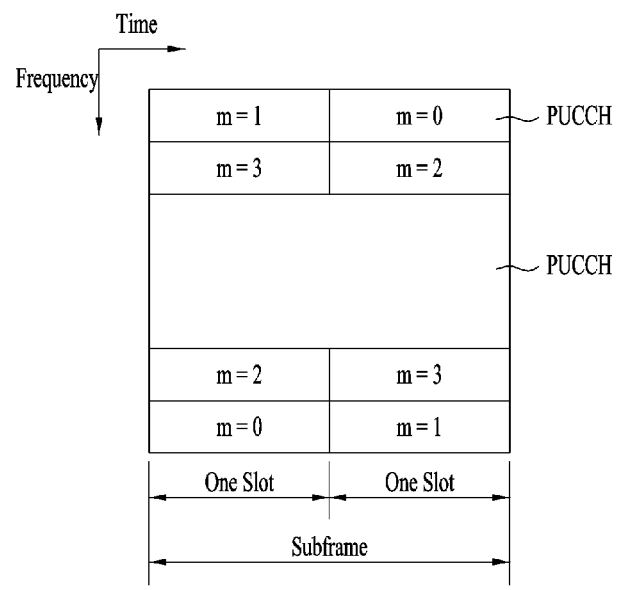
FIG. 9 illustrates the structure of a UL subframe in an LTE system.

FIG. 9 illustrates the structure of a UL subframe in an LTE system.

Referring to FIG. 9, a UL subframe includes a plurality of (e.g. 2) slots. A slot may include a different number of SC-FDMA symbols according to CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region in the frequency domain and the RB pair frequency-hops over a slot boundary.

The PUCCH may deliver the following control information.

SR: SR is information requesting UL-SCH resources and is transmitted using on-off keying (OOK).

HARQ ACK/NACK: HARQ ACK/NACK is a response signal to a DL data packet received on a PDSCH, indicating whether the DL data packet has been successfully received. 1-bit ACK/NACK is transmitted as a response to a single DL codeword and 2-bit ACK/NACK is transmitted as a response to two DL codewords.

CSI: CSI is feedback information regarding a DL channel. CSI includes a CQI and multiple input multiple output (MIMO)-related feedback information includes an RI, a PMI, a precoding type indicator (PTI), etc. The CSI occupies 20 bits per subframe.

The amount of UCI that the UE may transmit in a subframe depends on the number of SC-FDMA symbols available for transmission of control information. The remaining SC-FDMA symbols except for SC-FDMA symbols allocated to RSs in a subframe are available for transmission of control information. If the subframe carries an SRS, the last SC-FDMA symbol of the subframe is also excluded in transmitting the control information. The RSs are used for coherent detection of the PUCCH.

A detailed method for performing D2D communication, when D2D communication is adopted to the above-described wireless communication system (e.g., 3GPP LTE system or 3GPP LTE-A system), will be described herein below.

Figure 10:
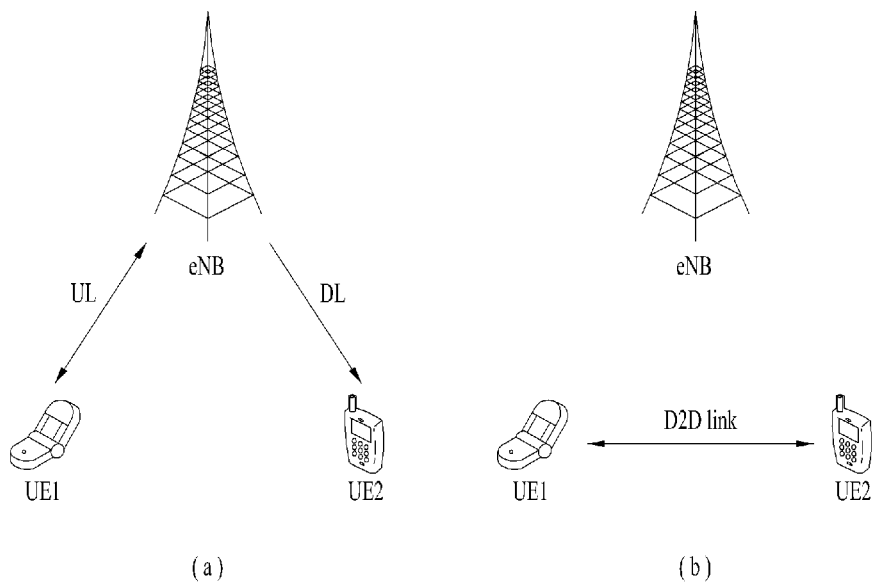
FIGS. 10 and 11 illustrate D2D communication.

FIG. 10 is a diagram for conceptually explaining D2D communication. FIG. 10(a) illustrates a conventional eNB-centered communication scheme in which a first UE UE1 may transmit data to an eNB on UL and the eNB may transmit data received from the first UE UE1 to a second UE UE2 on DL.

FIG. 10(b) illustrates a UE-to-UE communication scheme, as an example of D2D communication, in which UEs may exchange data without passing through an eNB. A link directly established between devices may be referred to as a D2D link. D2D communication has advantages of decrease in latency compared with the conventional eNB-centered communication scheme and reduction in necessary radio resources Since D2D communication is performed by reusing resources of an existing wireless communication system (e.g., 3GPP LTE/LTE-A) even if D2D communication is a communication scheme supporting communication between devices (or UEs) without passing through an eNB, D2D communication should not generate interference or disturbance with the existing wireless communication system. In the same context, it is also important to minimize interference of D2D communication generated by a UE and an eNB operating in the existing wireless communication system.

Hereinafter, an operation of providing an MBMS or an operation of using the MBMS or adopting a service similar to the MBMS, for UEs performing D2D communication, will be described based on the above-described statements.

Figure 11:
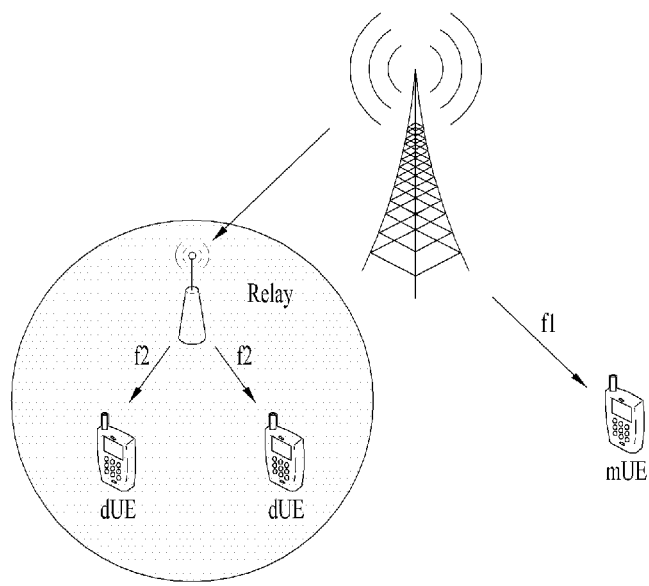

Referring to FIG. 11, UEs may perform direct communication (i.e., D2D communication) by directly forming links between UEs without passing through an eNB. Although only one-to-one communication is illustrated in FIG. 11 as D2D communication, one-to-many communication, many-to-one communication, or many-to-many communication may be used as D2D communication. Hereinafter, a description will be given based on a situation in which three types of entities including an eNB, a relay, and UEs are present for convenience of description. However, the present invention may be extended to other wireless communication systems (i.e., communication links) such as a small cell communication link, a femtocell-to-femtocell communication link, and an eNB-to-UE communication link.

Generally, in a wireless communication system under LTE-Rel. 10, an MBMS is preformed based on a multicell transmission scheme called an MBSFN scheme. In the MBSFN scheme, a plurality of eNBs simultaneously performs synchronized transmission in a preindicated resource region, thereby providing an improved signal to interference plus noise ratio (SINR) to a UE. If the MBMS is configured by higher layer signaling, the UE may receive the MBMS even without communication with an eNB (i.e., even in an RRC_idle mode). In other words, since the MBMS is transmitted through a physical multicast channel (PMCH), that does not support a HARQ operation and is transmitted in a plurality of cells, the MBMS increases delay spread and only an extended CP is used or QPSK transmission is performed in the MBMS.

The present invention provides a method for performing D2D communication through an MBMS using a UL resource (uplink MBMS, hereinafter, U_MBMS) defined for D2D communication rather than a conventional MBMS using a DL resource MBSFN subframe.

For example, if it is assumed that the system illustrated in FIG. 11 is an FDD system, an MBMS provided by the eNB (hereinafter, an eNB-MBMS) may use a DL frequency band f1 and an MBMS using a UL resource (i.e. U_MBMS) for D2D communication may use a UL frequency band f2. That is, although, in cellular communication, a UE does not receive signals in a UL band or a UL resource in principle, signal reception on the UL band/resource may be permitted in the present invention for the purpose of U_MBMS reception and information reception for D2D communication.

The relay illustrated in FIG. 11 forms a small cell with at least one UE adjacent to the relay. In this case, it is assumed that the influence of a transmission signal of the relay on UEs other than the small cell is restricted through proper coordination between the relay and the eNB.

In this situation, the relay may provide basic information so that D2D UEs may perform a D2D discovery and data communication operation through the U_MBMS and such information may be provided by an MBSFN scheme like the above-described eNB-MBMS. That is, if a specific resource region is allocated as an U_MBMS resource, all UEs or relays may be configured not to transmit services other than an MBMS for D2D communication on the allocated resource.

In this case, a single relay or multiple relays transmit the same U_MBMS signal in the specific resource region. For example, in a state in which the relay prereceives data to be transmitted in an U_MBMS through higher layer signaling or a data channel from the eNB, the relay may transmit the received data at a prescheduled U_MBMS time Information included in the U_MBMS may be a D2D grant (activation/deactivation) command, resource allocation to be used for D2D discovery and data communication (e.g., a frequency band, a subframe, and a hopping pattern), type of a D2D signal (e.g. public safety or non-public safety), and transmit power. Such information is basically transmitted to all UEs in a broadcast/multicast form and may be transmitted to multiple UEs using fewer resources according to the present invention. Additional resources may further be allocated, higher modulation (e.g., 8PSK, 16QAM, etc.) than QPSK may be used, or broadcast/multicast information and unicast information may be additionally transmitted through multiplexing by increasing a code rate.

In addition, even if a signal is transmitted in a broadcast/multicast form, a UE or a UE group may recognize the same signal (i.e. same U_MBMS signal) as an independent (e.g. different) meaning. For example, although UEs receive the same bit according to a UE identity, the UEs may interpret the bit as shown in Table 3.

TABLE 3

| D2D grant bit | UE_1 | UE_2 |
|---|---|---|
| 0 | D2D off | D2D off |
| 1 | D2D on | D2D off |
| 2 | D2D off | D2D on |

That is, even if information (e.g. bit) indicated by a D2D grant is the same as '1', UEs (i.e., UE_1 and UE_2) may differently interpret activation/deactivation (on/off) of D2D communication. Accordingly, the above operation may be used when all D2D UEs are divided into a plurality of groups and the respective groups are alternately activated/deactivated.

Figure 12:
FIG. 12 is a diagram referred to for explaining a signal format for a plurality of D2D groups according to the present invention.

FIG. 12 is diagram referred to for explaining transmission of control information for a plurality of D2D groups. As described above, D2D UEs may be predefined as at least one group and control information for all groups may be broadcast/multicast. Since a signal for each group is scrambled by a group ID, each UE group may acquire control information by decoding only a signal belonging thereto.

Further, when an eNB transmits an U_MBMS, since each UE is synchronized with the eNB with a different timing advance (TA) value and thus the UE may determine that delay spread increases, an extended CP is desirably used.

The eNB may transmit control information for D2D communication over a normal control/data channel without performing a U_MBMS. However, if the control information is transmitted through the U_MBMS according to the present invention, specific repeated information transmitted to a plurality of UEs may be transmitted using broadcast/multicast characteristics without wasting additional resources. If the U_MBMS is activated although cellular communication is not performed (i.e., RRC_idle mode), since the UEs receive an U_MBMS signal, the eNB may simultaneously indicate D2D communication to idle mode UE(s) in an emergency situation. If the U_MBMS is activated, not only cellular idle UEs but also D2D idle UEs can receive the U_MBMS signal. Therefore, since cellular communication is not used or is minimally used for D2D communication, power consumption of the UEs can be reduced. In addition, if a plurality of eNBs or relays transmits signals using an MBSFN scheme, since coverage is expanded, information according to D2D communication can be transmitted to more UEs in an emergency situation.

According to the present invention, not only an U_MBMS transmitted by a relay but also an U_MBMS transmitted directly by a UE-relay (indicating a UE capable of performing a relay operation for D2D communication) may be defined. That is, a specific UL subframe may be predesignated so as to be used for the U_MBMS and the U_MBMS having properties such as an extended CP and no HARQ operation may be transmitted in the specific UL subframe. Further, even when only a UE-relay is present in eNB coverage, the UE-relay may receive information from the eNB first and then transmit the information to another UE using the U_MBMS, so that D2D coverage can be expanded.

In this case, through the U_MBMS, the UE-relay may i) request that a counterpart UE transmit/receive D2D discovery, or ii) transmit a D2D discovery signal of the UE-relay or D2D related basic information (e.g., resource allocation and hopping pattern to be used for D2D communication, a D2D period, information regarding public safety/non public safety, etc.). If a D2D operation is classified into an idle state and a connected state as in a cellular operation, UEs in a D2D idle state may determine whether D2D communication is requested by monitoring a U_MBMS resource region (U_MBMS subframe). If the D2D request is confirmed, the idle mode UEs may be configured to start a D2D discovery operation.

The above-described U_MBMS should not be limitedly interpreted only as being used for the UE-relay/UE and the present invention may be extended to an eNB that performs the U_MBMS using a UL resource. In addition, the present invention may be applied to the case in which an eNB, a UE-relay, a femto cell, or a UE transmits the above-described D2D control information to some of resource regions for a conventional DL MBMS or transmits the above-described D2D control information to all resource regions for a conventional DL MBMS.

U_MBMS transmission according to the present invention may be performed outside of coverage of a cellular region. That is, when the U_MBMS is transmitted in a situation in which only UEs are present outside of cell coverage, one of the UEs may serve as a master and transmit the U_MBMS. In this case, it is assumed that the UEs outside of cellular coverage are synchronized with a synchronization signal that a UE transmitting the U_MBMS (i.e. master UE) or a synchronization reference UE transmits.

For example, a UE serving as a master (hereinafter, a master UE) may transmit a synchronization signal, a discovery signal (of the master UE), and scheduling information of each UE through the U_MBMS. Then, UEs corresponding to slaves (hereinafter, slave UEs) that receive the U-MBMS from the master UE may transmit response signals according to synchronization, reception of the discovery signal of the master UE, and scheduling information (to the master UE).

Alternatively, the master UE transmits a synchronization signal, a D2D discovery request of other UEs, information as to whether other UEs perform D2D communication (i.e. activation/deactivation), and scheduling information of each UE and the slave UEs perform synchronization with the master UE. Then, the (slave) UEs that have received the D2D request may perform D2D discovery suitable for scheduling information.

Figure 13:
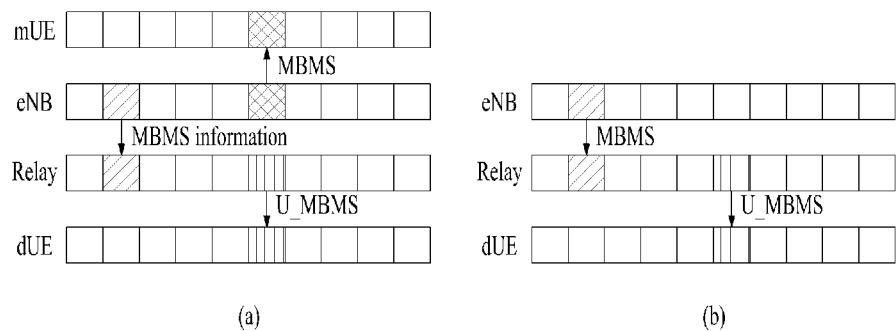
FIG. 13 is a diagram referred to for explaining coverage expansion through an MBMS using a UL resource according to the present invention.

Furthermore, the U_MBMS may be used for expansion of coverage of an eNB-MBMS as well as D2D communication. Referring to FIG. 13, it is assumed that UEs performing D2D communication (hereinafter, dUEs) are located in a shadow area so that the dUEs cannot receive an MBMS from an eNB.

In this situation, a macro UE (mUE) and a relay that have ensured links from an eNB as illustrated in FIG. 13(*a*) may pre-receive MBMS information from the eNB, inform dUEs of a transmission timing and a transmission resource of a U_MBMS, and perform U_MBMS transmission. The U_MBMS that is used to expand coverage is desirably transmitted in the same subframe as a subframe transmitted for an eNB-MBMS to maintain simultaneous characteristics of broadcast/multicast of the MBMS.

The relay may receive the eNB-MBMS without additionally receiving the MBMS information and retransmit the information (i.e., eNB-MBMS) after a predetermined time as illustrated in FIG. 13(*b*). In this case, there is an advantage of not requiring an additional signal between the eNB and the relay.

Figure 14:
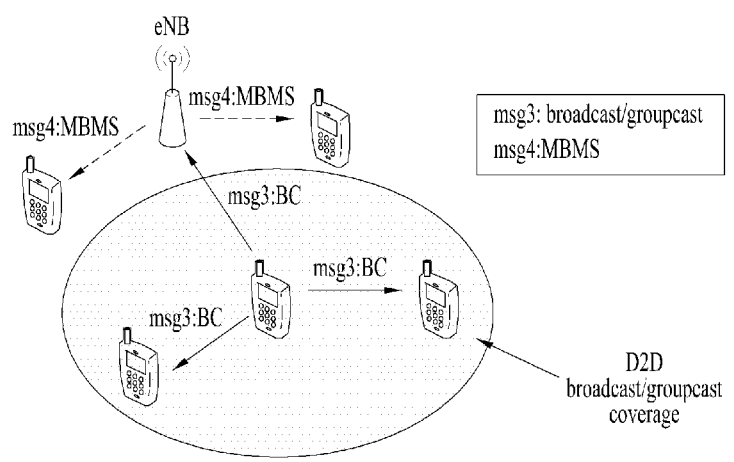
FIGS. 14 and 15 are diagrams referred to for explaining an example of performing D2D broadcast/groupcast of a UE according to the present invention.
Figure 15:
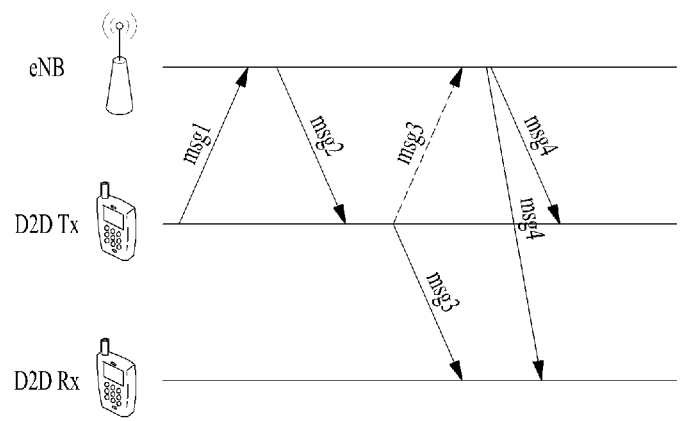

FIGS. 14 and 15 are diagrams referred to for explaining the case in which a UE performs D2D broadcast/groupcast according to an embodiment of the present invention.

As illustrated in FIG. 14, the present invention may be applied even to the case in which the UE includes broadcast/groupcast information. That is, in the present invention, when the UE tries to use a D2D broadcast/groupcast function for the purpose of an emergency situation (or advertising or public information), a D2D UE may perform broadcast/groupcast by modifying a conventional RACH procedure.

For example, in the present invention, it is assumed that messages in the conventional RACH procedure are used in order of msg1: PRACH, msg2: RAR, msg3: broadcast/groupcast contents, and msg4: retransmission (ACK/NACK). That is, the, UE may use msg3 to perform broadcast/groupcast to another D2D UE instead of transmitting msg3 to an eNB and msg4 may be a signal transmitted by an eNB or a D2D reception UE that has received msg3. An MBMS may be used in order to transmit msg4 and the MBMS for transmitting msg4 includes an MBMS using a UL resource (i.e. U_MBMS) as well as a conventional MBMS using a DL resource.

Therefore, referring to FIG. 15, msg1 and msg2 are used in a procedure between an eNB and a D2D transmission (Tx) UE and msg3 is used in a procedure between the D2D Tx UE and a D2D reception (Rx) UE. That is, msg3 will be transmitted only to UEs adjacent to the D2D Tx UE as broadcast/groupcast information due to limitations of D2D coverage. In this case, the eNB may simultaneously receive msg3 (i.e., a broadcast/groupcast signal) together with UEs adjacent to the D2D Tx UE and (re)transmit this (i.e., msg3) using the U_MBMS corresponding to a msg4 transmission method, thereby expanding coverage. That is, a normal emergency signal will be transmitted with a maximum transmit power permitted by the UE or a power value approximating the maximum transmit power. Then, the eNB may successfully receive the broadcast/groupcast signal (i.e., msg3) and may (re)transmit msg3 through msg4 (검토 부탁드립니다) after decoding msg3 so that the D2D Rx UE can raise reception performance by a chase combining scheme or an incremental redundancy scheme.

Accordingly, the D2D Rx UE may receive an MBMS signal of msg4 and raise a reception rate of broadcast/groupcast information through combination with msg3. In addition, the D2D Tx UE may receive the MBMS signal of msg4. Upon successfully decoding the MBMS signal (based on an ID of the D2D Tx UE), the D2D Tx UE may recognize the MBMS signal as ACK and stop transmitting the broadcast/groupcast signal. Upon failing to decode or receive the msg4 signal, the D2D Tx UE may recognize the msg4 signal as NACK and retransmit the next broadcast/groupcast signal. When the D2D Tx UE recognizes msg4 as NACK and thus retransmit the broadcast/groupcast signal, although a procedure for performing D2D broadcast/groupcast of the UE may resume beginning from msg1, a procedure (using msg2) such as resource allocation may be omitted and the procedure for performing D2D broadcast/groupcast may resume beginning from a procedure for retransmitting msg3.

Figure 16:
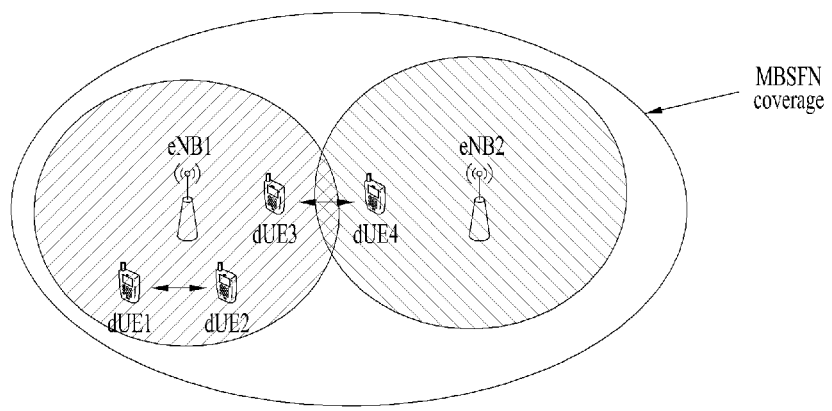
FIG. 16 is a diagram illustrating inter-cell D2D communication.

FIG. 16 illustrates inter-cell D2D communication. Inter-cell D2D communication will now be described with reference to FIG. 16. According to the present invention, information may be transmitted to D2D UEs belonging to different cells through a U_MBMS. That is, control information of inter-cell D2D may be transmitted.

For example, it is assumed that UEs such as a D2D UE pair of {dUE3, dUE4} of FIG. 16 belong to different cells and perform D2D communication. In this case, if system frame numbers of eNB1 and eNB2 are different, the range of a D2D subframe and a D2D resource indicated by an eNB is limited to a range within a cell (i.e., {dUE1, dUE2, dUE3} in the case of eNB1 and {dUE4} in the case of eNB2). Accordingly, inter-cell D2D communication cannot be performed between different UEs.

Therefore, the present invention proposes a method in which two (or more) eNBs provide necessary information such as a D2D timing (subframe number), a transmission resource, allocation information related to the transmission resource, and a D2D service type through a U_MBMS by a single frequency network (SFN) scheme and UEs receive D2D information irrespective of cells to which the UEs belong. That is, according to the present invention, since the D2D information is simultaneously transmitted to UE(s) of a plurality of cells using the U_MBMS, information necessary for inter-cell D2D communication can be provided.

In FIG. 16, eNB1 and eNB2 inform dUEs belonging thereto of information such as a timing and period of a U-MBMS so that the dUEs may receive the U_MBMS. Although the information may be indicated through a higher layer signal (e.g., dedicated RRC) to each UE by a specific (i.e., dedicated) scheme, the information may be transmitted to all UEs through an MBMS. Accordingly, the UEs may receive the U_MBMS at an indicated U-MBMS timing by receiving the information. Since the eNBs transmit the U_MBMS by an SFN scheme, coverage of the U_MBMS includes both cells (i.e., eNB1 and eNB2) and the information may be transmitted to UEs belonging to both cells at the same timing. Accordingly, the UE may perform D2D communication regardless of a cell although the UE is not aware of which eNB transmits the U_MBMS.

The U_MBMS may be configured in the form of one of normal MBMS data and D2D control information and may be configured in the form of both the normal MBMS data and the D2D control information.

Figure 17:
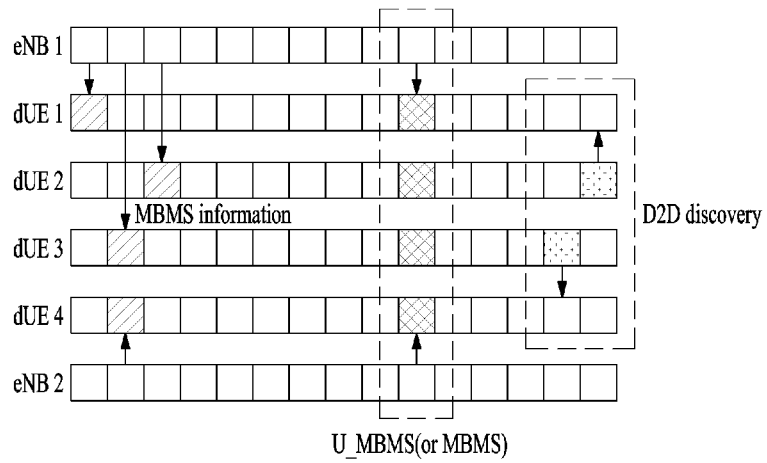
FIG. 17 is a diagram referred to for explaining a discovery subframe allocated to each UE receiving an MBMS using a UL resource according to an embodiment of the present invention.

FIG. 17 is a diagram referred to for explaining the case in which UEs receiving a U_MBMS have different discovery subframes. As illustrated in FIG. 17, when D2D control information (e.g., D2D subframe allocation, resource allocation, initial discovery power, etc.) is contained in a data region of the U_MBMS, the UEs may perform a D2D operation based on the received D2D control information.

Figure 18:
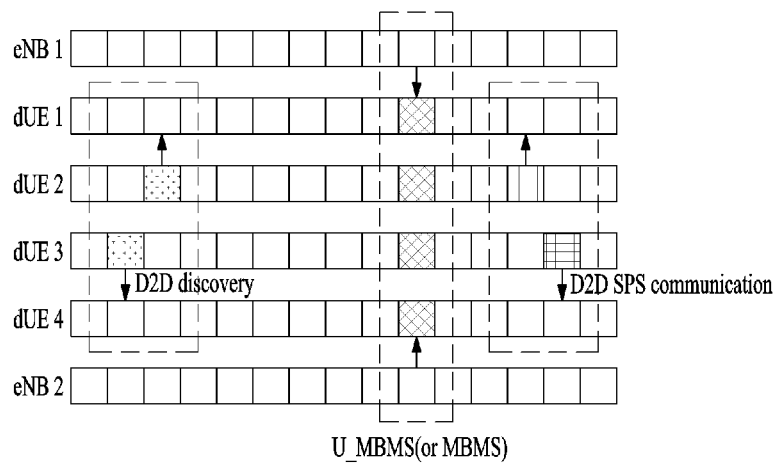
FIG. 18 is a diagram referred to for explaining D2D communication of a semi-persistent scheduling (SPS) scheme using a U_MBMS of a UL resource.

FIG. 18 is a diagram referred to for explaining D2D communication of a semi-persistent scheduling (SPS) scheme using a U_MBMS.

In FIG. 18, an eNB may semi-statically control an operation of D2D discovery on/off, discovery resource allocation, and discovery transmit power using the U_MBMS. If the period of the U_MBMS is configured to be short, for example, 8 ms, 10 ms, etc., the eNB may control D2D communication using a semi-dynamic characteristic. SPS D2D communication may be used to control data communication and this operation is useful especially for semi-static data communication.

That is, a subframe or a subframe candidate set for D2D SPS may be designated in the U_MBMS and a UE may perform D2D data communication in an SPS form in the corresponding subframe or a specific subframe selected from the candidate set. Accordingly, both discovery and SPS D2D communication may be controlled using the U_MBMS.

Further, information of the U_MBMS may be interpreted as other meanings based on IDs of dUEs. For example, a specific ID group may perform D2D communication in subframe N+4 at a timing when an MBMS is received (e.g., N) and dUEs of another group may perform D2D communication in subframe N+6. Obviously, D2D information may be transmitted for the same reason to a (DL) MBMS instead of the U_MBMS. Desirably, D2D control information may be transmitted by allocating some resources of a data region of the DL MBMS.

Figure 19:
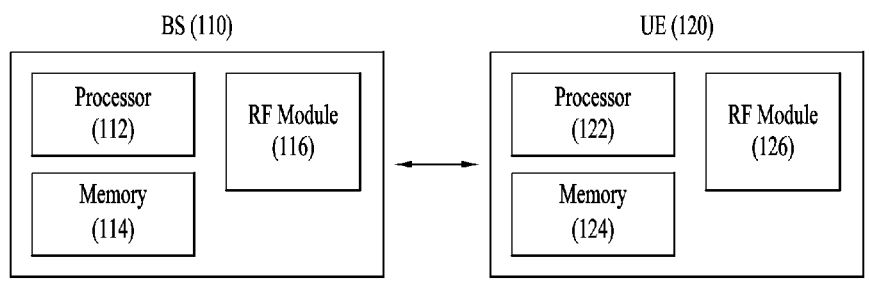
FIG. 19 illustrates a BS and a UE that are applicable to an embodiment of the present invention.

FIG. 19 illustrates a BS and a UE that are applicable to an embodiment of the present invention. If a wireless communication system includes a relay, communication in a backhaul link is performed between the BS and the relay and communication in an access link is performed between the relay and the UE. Accordingly, the BS or the UE shown in FIG. 13 may be replaced with the relay according to situation.

Referring to FIG. 19, a wireless communication system includes a BS 110 and a UE 120. The BS 110 includes a processor 112, a memory 114, and a Radio Frequency (RF) unit 116. The processor 112 may be configured to perform the proposed procedures and/or methods according to the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described multimedia broadcast/multicast service method for D2D communication in a wireless communication system and the apparatus therefor have been described centering on an example applied to a 3GPP LTE system, the present invention is applicable to a variety of wireless communication systems in addition to the 3GPP LTE system.

What is claimed is:

1. A method of transmitting a device to device (D2D) signal to a plurality of User Equipments (UEs) by a first user equipment (UE) in a wireless communication system, the method comprising:
receiving D2D control information for D2D communication;
transmitting the D2D signal including the D2D control information to a second UE among the plurality of UEs corresponding to a counterpart entity of the D2D communication; and
decoding the D2D signal based on an identifier of the first UE upon receiving the D2D signal retransmitted by the BS wherein, if decoding is successful, the first UE determines that the D2D signal has been successfully transmitted to the second UE, and wherein the D2D signal is configured to be transmitted using an uplink resource.

2. The method according to claim 1, wherein the D2D control information is configured for D2D discovery and D2D data communication.

3. The method according to claim 1, wherein the D2D signal is configured to include at least one of a D2D grant, resource allocation information for D2D communication, a D2D signal type, or transmit power.

4. The method according to claim 1, wherein the D2D signal is transmitted using an extended cyclic prefix.

5. The method according to claim 1, wherein the D2D signal is configured to be monitored by a UE in a D2D idle state or a UE in a radio resource control (RRC) idle state.

6. The method according to claim 1, wherein, if the D2D signal is received by a base station (BS), the BS retransmits the D2D signal through a downlink resource.

7. The method according to claim 1, wherein the D2D control information for D2D communication is transmitted by a base station (BS) using a single frequency network (SFN) scheme.

8. The method according to claim 7, wherein the first UE and the second UE belong to different BSs and the D2D control information for D2D communication is transmitted by eNBs corresponding to the first UE and the second UE.

9. The method according to claim 7, wherein the second UE does not belong to the BS.

10. The method according to claim 8, wherein the D2D signal is configured to include at least one of a synchronization signal for D2D communication, time information for D2D communication, radio resource allocation information for D2D communication, or a type of D2D communication.

11. The method according to claim 1, wherein the D2D signal is semi-statically transmitted.

12. The method according to claim 1, wherein the first UE and the second UE are not present in coverage of a BS.

13. A first user equipment (UE) for transmitting a device to device (D2D) signal to a plurality of User Equipments (UEs) in a wireless communication system, the first UE comprising:

a radio frequency (RF) unit; and a processor, wherein the processor is configured to
receive a device to device (D2D) signal control information for D2D communication transmit the D2D signal including the D2D control information to a second UE among the plurality of UEs corresponding to a counterpart entity of the D2D communication, and decode the D2D signal based on an identifier of the first UE upon receiving the D2D signal retransmitted by the BS, wherein, if decoding is successful, the first UE determines that the D2D signal has been successfully transmitted to the second UE, and wherein the D2D signal is configured to be transmitted using an uplink resource.

* * * * *